United States Patent [19]
Nagashima

[11] Patent Number: 4,499,500
[45] Date of Patent: Feb. 12, 1985

[54] TWO-SIDE IMAGE FORMING APPARATUS

[75] Inventor: Nao Nagashima, Yokohama, Japan

[73] Assignee: Canon Kabushiki Kaisha, Tokyo, Japan

[21] Appl. No.: 392,340

[22] Filed: Jun. 25, 1982

[30] Foreign Application Priority Data

Jul. 7, 1981 [JP] Japan ................. 56-106405

[51] Int. Cl.³ .................. H04N 1/26; H04N 1/40
[52] U.S. Cl. ..................... 358/296; 358/280; 358/293; 358/300
[58] Field of Search ............... 358/280, 293, 296, 300, 358/256, 257; 364/523; 355/23, 24, 14 SH, 20

[56] References Cited

U.S. PATENT DOCUMENTS 4,213,694  7/1980  Kuseski ..................... 358/300

Primary Examiner—Howard W. Britton
Attorney, Agent, or Firm—Fitzpatrick, Cella, Harper & Scinto

[57] ABSTRACT

An image forming apparatus capable of high-speed image formation on both sides of a sheet. After image formation on the first side, the transport path of the sheet is so changed that image formation can be immediately conducted on the second side of the sheet.

8 Claims, 22 Drawing Figures

FIG. 7-a 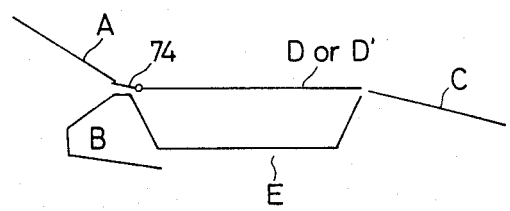
FIG. 7-b 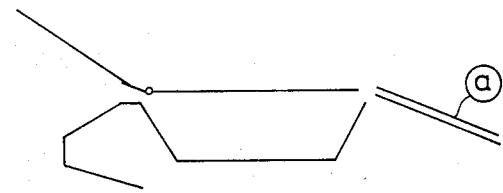
FIG. 7-c 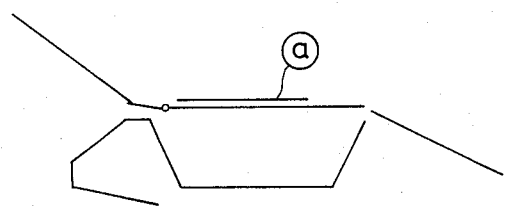
FIG. 7-d 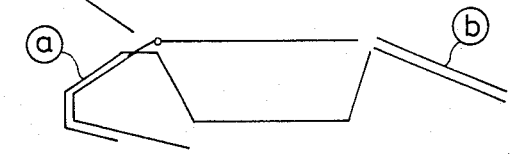
FIG. 7-e 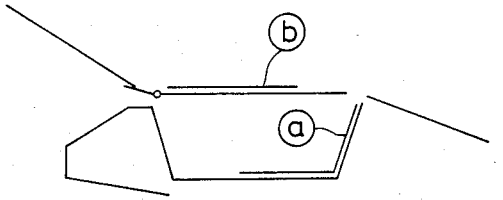
FIG. 7-f 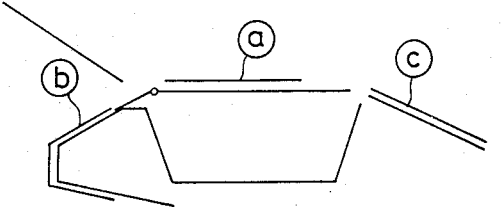

FIG. 7-g 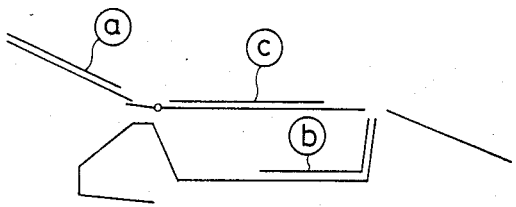
FIG. 7-h 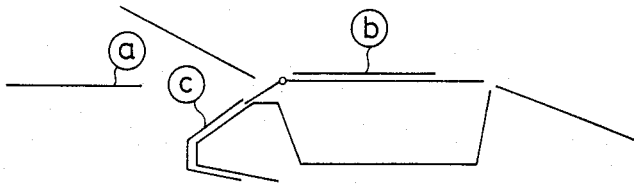
FIG. 7-i 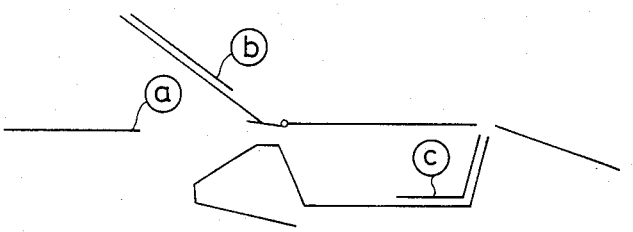
FIG. 7-j 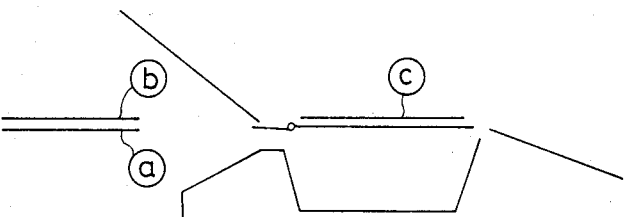
FIG. 7-k 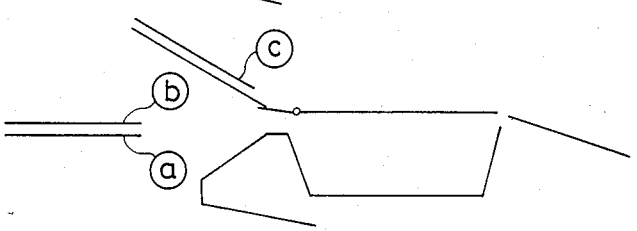
FIG. 7-l 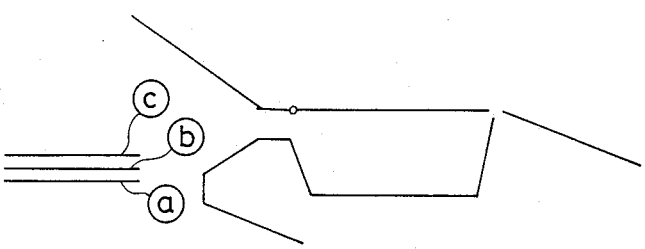

FIG. 8

| CORRE-SPONDING FIG. \ PAPER PATH FLAG | FA | FD' | FF | FB | FD | FC |
|---|---|---|---|---|---|---|
| FIG. 7-a | 0 | 0 | 0 | 0 | 0 | 0 |
| FIG. 7-b | 0 | 0 | 0 | 0 | 0 | 1 |
| FIG. 7-c | 0 | 0 | 0 | 0 | 1 | 0 |
| FIG. 7-d | 0 | 0 | 0 | 1 | 0 | 1 |
| FIG. 7-e | 0 | 0 | 1 | 0 | 1 | 0 |
| FIG. 7-f | 0 | 1 | 0 | 1 | 0 | 1 |
| FIG. 7-g | 1 | 0 | 1 | 0 | 1 | 0 |
| FIG. 7-h | 0 | 1 | 0 | 1 | 0 | 0 |
| FIG. 7-i | 1 | 0 | 1 | 0 | 0 | 0 |
| FIG. 7-j | 0 | 1 | 0 | 0 | 0 | 0 |
| FIG. 7-k | 1 | 0 | 0 | 0 | 0 | 0 |
| FIG. 7-l | 0 | 0 | 0 | 0 | 0 | 0 |

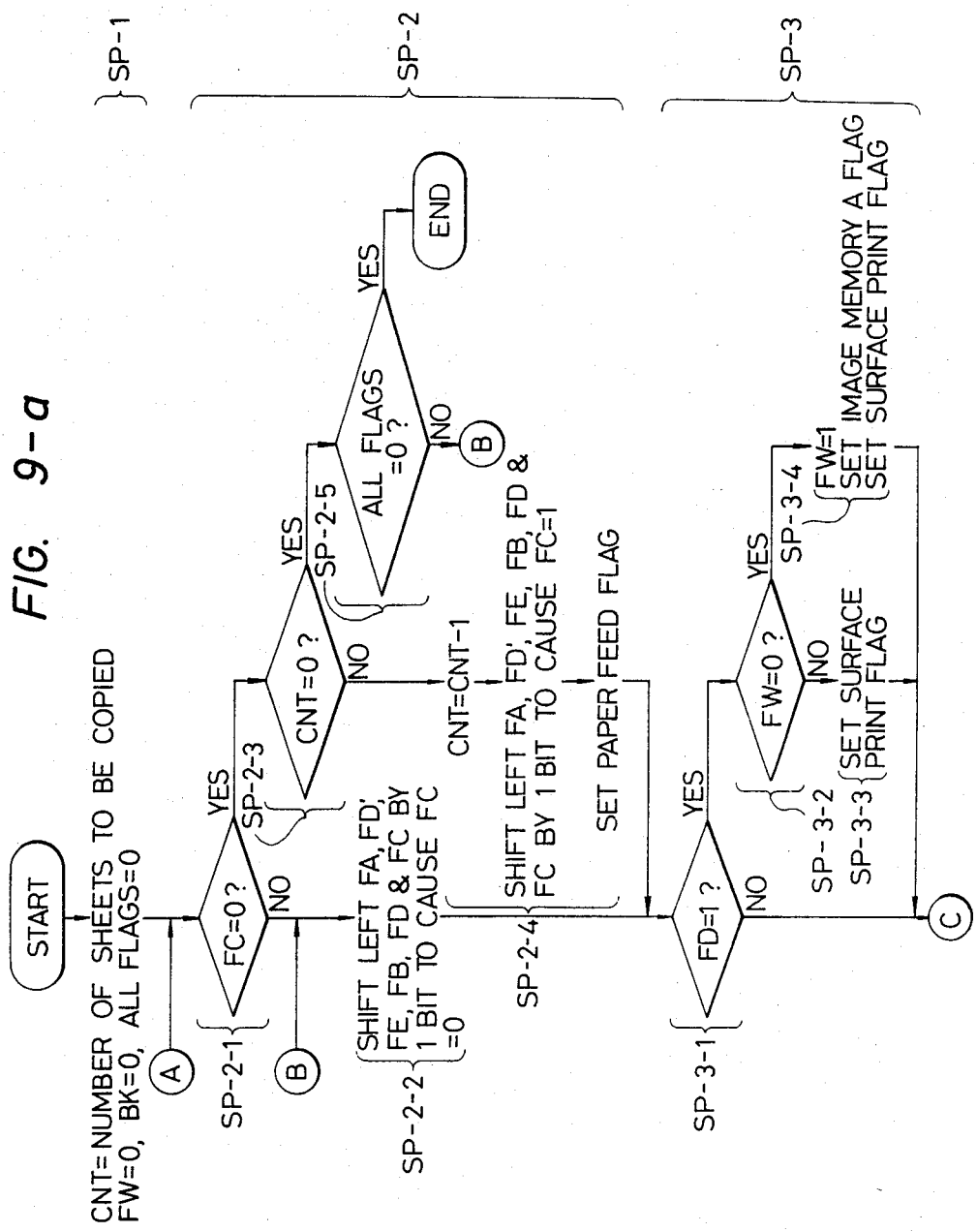
FIG. 9-a

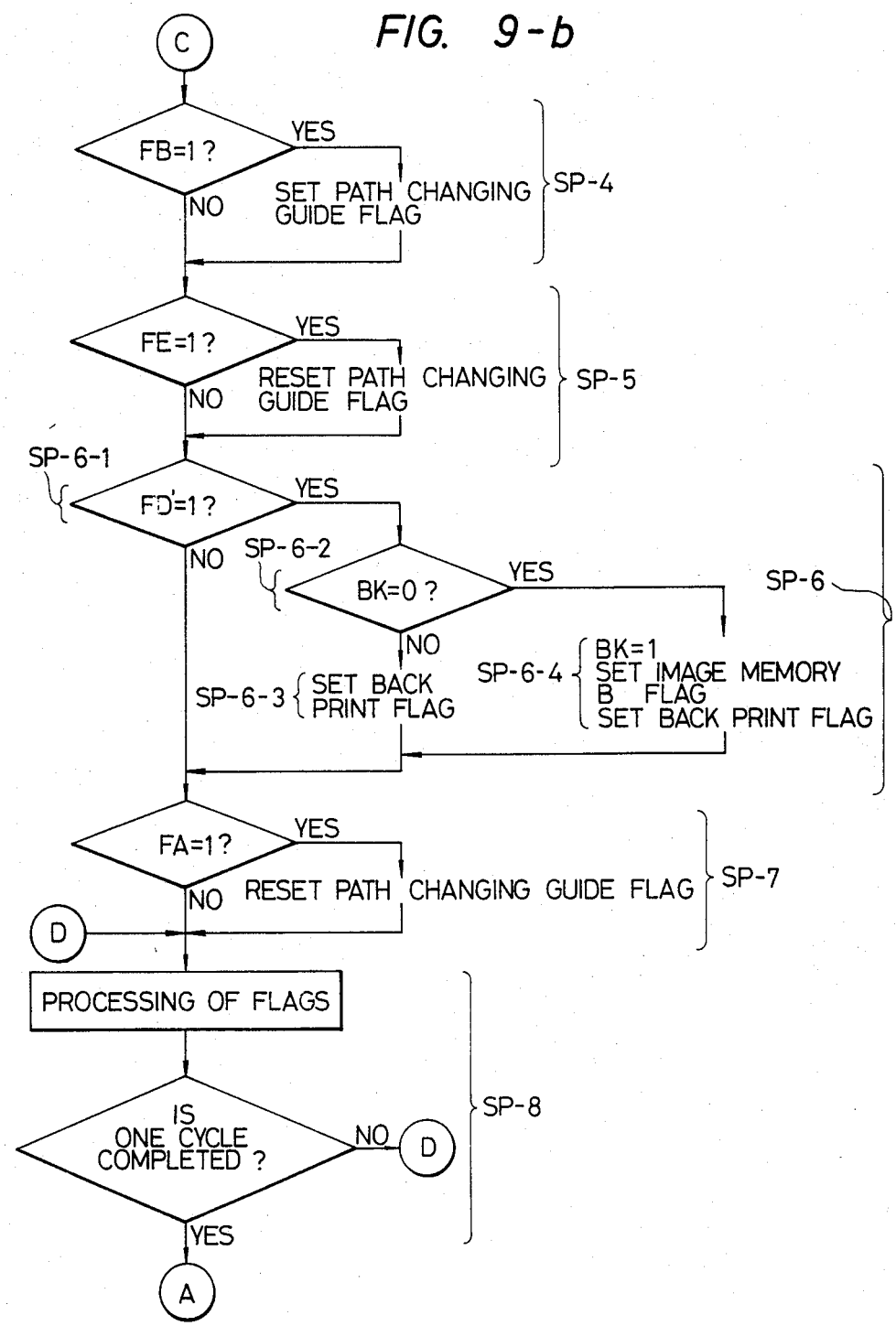
FIG. 9-b

FIG. 10

| FLAG | FUNCTION |
|---|---|
| PAPER FEED FLAG | TO FEED COPYING PAPER FROM PAPER STORE 80. |
| IMAGE MEMORY A FLAG | TO READ ORIGINAL IMAGE TO BE FORMED ON THE SURFACE OF A COPYING PAPER AND STORE IT INTO IMAGE MEMORY A (27). |
| IMAGE MEMORY B FLAG | TO READ ORIGINAL IMAGE TO BE FORMED ON THE BACK OF A COPYING PAPER AND STORE IT INTO IMAGE MEMORY B (28). |
| SURFACE PRINT FLAG | TO FORM AN IMAGE ON THE SURFACE OF A COPYING PAPER. |
| BACK PRINT FLAG | TO FORM AN IMAGE ON THE BACK OF A COPYING PAPER. |
| FLAG FW | TO INDICATE WHETHER AN ORIGINAL IMAGE INFORMATION TO BE FORMED ON THE SURFACE OF A COPYING PAPER IS STORED IN IMAGE MEMORY A (27) OR NOT. |
| FLAG BK | TO INDICATE WHETHER AN ORIGINAL IMAGE INFORMATION TO BE FORMED ON THE BACK OF A COPYING PAPER IS STORED IN IMAGE MEMORY B (28) OR NOT. |
| PATH CHANGING GUIDE FLAG | TO SWITCH THE PATH CHANGING GUIDE 74. |

TWO-SIDE IMAGE FORMING APPARATUS

BACKGROUND OF THE INVENTION

1. Field of the Invention

The present invention relates to a two-side image forming apparatus capable of image formation on both sides of a recording sheet.

2. Description of the Prior Art

In the conventional two-side copying apparatus in which one exposure of the original document provides an image only on one side of the recording sheet, two-side copying on plural sheets have to be made by firstly forming images on one side of recording or transfer sheets of a required number, and then forming images of the same number on the other side of said sheets. Such process requires an intermediate tray which inevitably renders the entire apparatus bulky, and involves a complicated mechanism. Also, since the image formation is conducted for a required number of times on the first side of the sheets and then for the same number of times on the second side of the sheets in this process, the image formation on the first side has to be repeated afterwards in case the transfer sheets are lost for example by jamming in the image forming step on the second side thereof, and the control of the apparatus has to be complicated by such fact. Besides such two-side copier tends to cause yellowing of the original document because of repeated exposures to strong illumination required for high-speed copying.

SUMMARY OF THE INVENTION

The object of the present invention is to provide a two-side image forming apparatus not associated with the above-mentioned drawbacks and capable of high-speed image formation on two sides of sheets with a simple control.

Another object of the present invention is to provide a two-side image forming apparatus capable of efficient image formation on both sides.

Still other objects of the present invention will become apparent from the following description of the preferred embodiments to be taken in conjunction with the attached drawings.

BRIEF DESCRIPTION OF THE DRAWINGS

FIGS. 7-a–7-l are schematic views showing the flow of transfer sheets (a)–(c); thus FIG. 7-a shows the path A-E for the transfer sheets;

FIG. 7-b shows transfer sheet a at the feed position;

FIG. 7-c shows the transfer sheet at the imaging station;

FIG. 7-d shows sheet a being fed back for imaging on the reverse side and sheet b at the feed position;

FIG. 7-e shows sheet a about to reenter the imaging station in inverted attitude and sheet b at the imaging station;

FIG. 7-f shows sheet a inverted on the imaging station, sheet b being fed back for imaging on the reverse side and sheet c at the feed position;

FIG. 7-g shows sheet a imaged on both sides being conveyed from the apparatus, sheet b about to reenter the imaging station and sheet c at the imaging station;

FIG. 7-h shows sheet a in a receiving tray, sheet b inverted on the imaging station and sheet c being fed back for imaging on the reverse side;

FIG. 7-i shows sheet b imaged on both sides being conveyed from the apparatus and sheet c about to reenter the imaging station in inverted attitude;

FIG. 7-j shows sheet b in the tray and sheet c at the imaging station;

FIG. 7-k shows sheet c being conveyed from the apparatus; and

FIG. 7-l shows sheets a, b and c stacked on the tray.

FIG. 8 is a chart showing the flag status respectively corresponding to the state of transfer sheets shown in FIGS. 7-a–7-l;

FIGS. 9-a and 9-b are control flow charts according to the present invention; and FIG. 10 is a chart showing the functions of flags used in the control flow charts shown in FIG. 9.

DESCRIPTION OF THE PREFERRED EMBODIMENT

Now the present invention will be clarified in detail by the following description to be taken in conjunction with the attached drawings.

Figure 1:
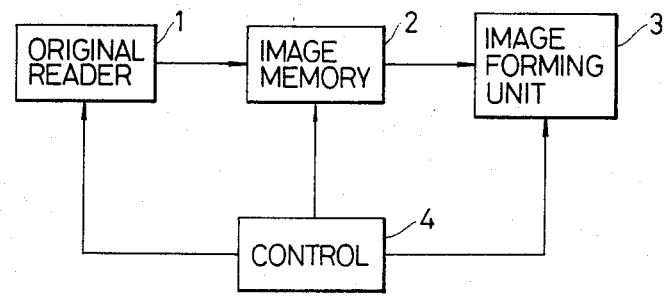
FIG. 1 is a block diagram of the basic structure of the present invention.

FIG. 1 is a block diagram of the basic structure of the present invention, wherein shown are an original reading unit 1 for reading image information from an original document; an image memory unit 2 for storing image information obtained from the original reading unit and capable of storing information at least corresponding to two pages of the original; an image forming unit 3 for image formation on a recording sheet such as paper according to the image information stored in the image memory unit 2; and a control unit 4 for controlling the functions of said original reading unit 1, image memory unit 2 and image forming unit 3.

A typical example of the process conducted in the above-mentioned apparatus comprises the steps of:

(1) reading the first side of the original with the original reading unit and storing the image information in an image memory in the image memory unit 2;

(2) reading the second side of said original with the original reading unit 1 and storing the image information in the image memory in the image memory unit 2;

(3) reproducing the first original image on the first side of a transfer sheet in the image forming unit 3 according to the image information stored in said image memory;

(4) inverting said transfer sheet having the reproduced image on the first side thereof and reproducing the second original image on the second side of said inverted transfer sheet; and (5) repeating the above-mentioned steps (3) and (4) for a desired number of times.

The foregoing process is initiated for example in response to an instruction signal entered into the control unit 4, which automatically controls the original reading and image formation.

Consequently images of any desired number can be formed by only two exposures of the original document. Also the control is simplified since the original reading need not be synchronized with the image formation. Besides the image formation consecutively conducted on both sides allows elimination of the intermediate storage such as an inermediate tray for storing transfer sheets with reproduced image only on one side thereof, thus reducing the dimension of the apparatus.

Now reference is made to FIGS. 2 to 5 for further explanation of the apparatus of the present invention.

Figure 2:
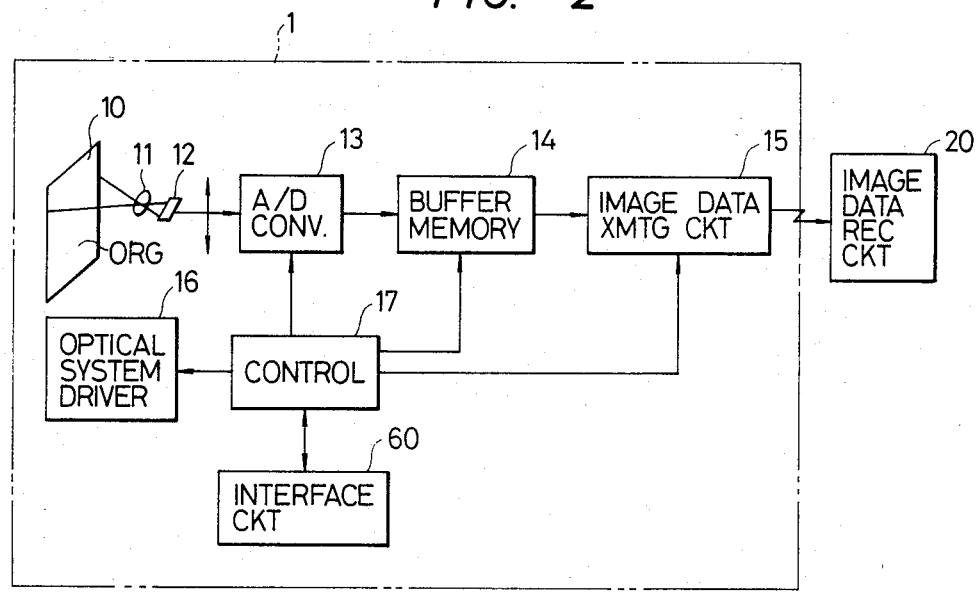
FIG. 2 is a block diagram showing an embodiment of an original reading unit.

FIG. 2 shows an embodiment of the original reading unit 1, in which the image on an original 10 is read by displacement of said original 10 or a lens 11 and a charge-coupled device (CCD) 12, caused by an optical system driver circuit 16, in a direction perpendicular to the image reading direction of said CCD 12. The image signal obtained by said CCD 12 is subjected to analog-digital conversion by an A/D converter 13 and temporarily stored in a buffer memory 14. The image signal is then synchronized and coded in an image signal transmitting circuit 15 and supplied to the image memory unit 2. A control circuit 17 controls the function of the entire original reading unit 1 in response to signals from the control unit 4.

Figure 3:
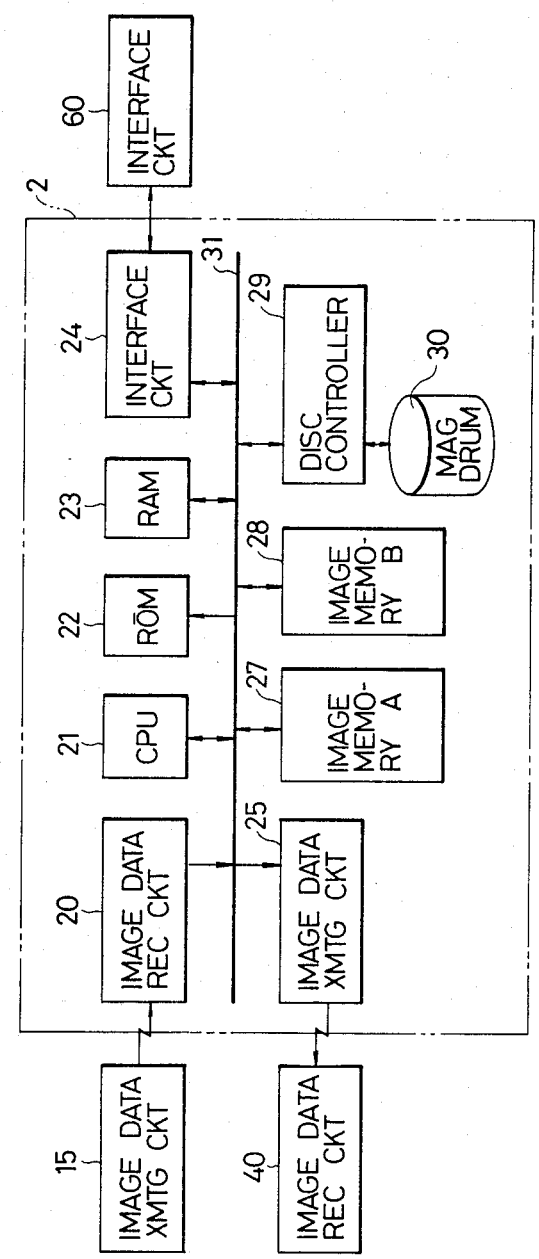
FIG. 3 is a block diagram showing an embodiment of an image memory unit.

FIG. 3 shows an embodiment of the image memory unit 2, in which the coded signal from the image signal transmitting circuit 15 is received and converted in an image signal receiving circuit 20, and is stored in an image memory A27 or another image memory B28 through a bus line 31. Each of said image memory 27, 28 is capable of storing an image signal corresponding to one side of a maximum original readable by the original reading unit 1. Consequently the images on the first and second sides of the original are respectively stored in the image memories 27 and 28. The image memory unit 2 is controlled by a central processing unit (CPU) 21 which is provided with a read-only memory (ROM) 22 for storing the control programs and a random access memory (RAM) 23 for executing programs and controls the aforementioned memories in response to instruction signals received from the control unit 4 through an interface circuit 24. For example signals are transferred from a magnetic disk 29 to the image memories 27, 28 through a disk controller 29 and the bus line 31, or from said memories 27, 28 to said disk 30. Also the CPU 21 is capable of transferring signals between the image memories 27, 28 for synthesizing, extracting or erasing the images. The signals stored in the image memories 27, 28 are coded in the image signal transmitting circuit 25 and supplied to the image forming unit 3.

Figure 4:
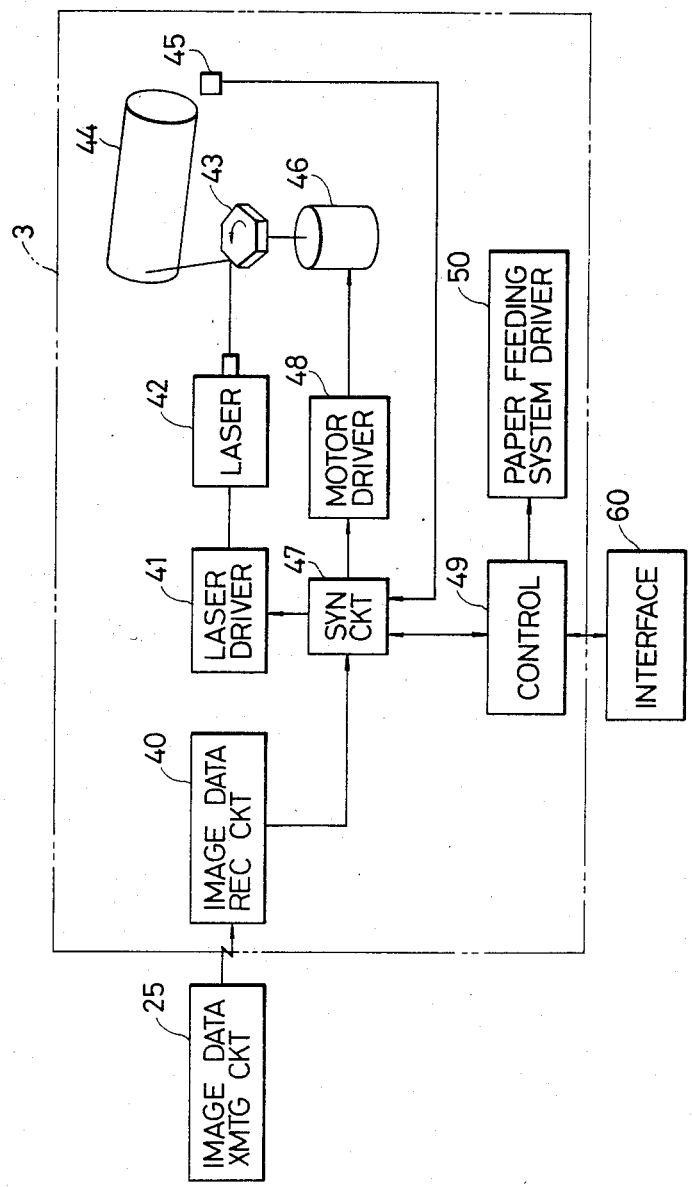
FIG. 4 is a block diagram showing an embodiment of an image forming unit.

FIG. 4 shows an embodiment of the image forming unit 3, in which the image signal supplied from the image signal transmitting circuit 25 is received and converted in an image signal receiving circuit 40, then synchronized in a synchronizing circuit 47 and converted into a laser beam through a laser driver 41 and a laser unit 42. Said synchronizing circuit 47 controls a motor driver 48 for driving a motor 46 which rotates a polygonal mirror 43. The laser unit 42 and the polygonal mirror 43, sychronized by the laser beam detection with a beam detector 45, forms an electrostatic latent image on a photosensitive member 44. In the present embodiment image formation is conducted by an electrophotographic process. Image formation through a combination of laser and electrophotography is already known and will not therefore be explained in detail. The above-mentioned synchronizing circuit 47 is controlled by a control circuit 49 which controls the entire image forming unit 3, in response to the instructions from the control unit 4. Also said control circuit 49 controls a paper feed driver 50 for activating a mechanism for image formation on both sides of the transfer sheet as will be explained later.

Figure 5:
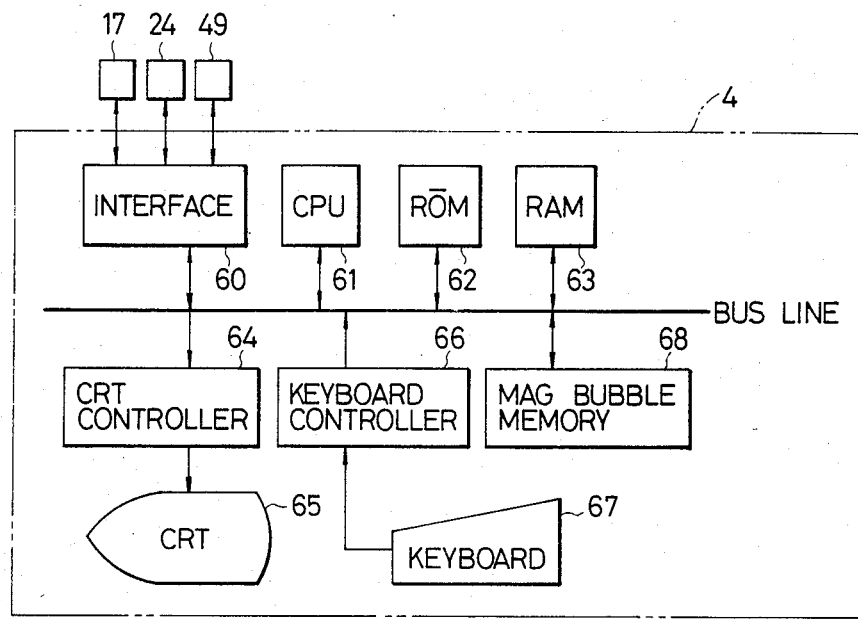
FIG. 5 is a block diagram showing an embodiment of a control unit for controlling the original reading unit, image memory unit and image forming unit.

FIG. 5 shows an embodiment of the control unit 4, in which control signals to the original reading unit 1, image memory unit 2 and image forming unit 3 are released through an interface circuit 60, and the information from said units are supplied to a central processing unit (CPU) 61 through said interface circuit 60. Said CPU 61, being provided with a read-only memory (ROM) 62 for program storage, a random access memory (RAM) 63 for program execution, a CRT controller 64 which controls a cathode ray tube 65 and a keyboard controller 66 which controls a keyboard 67, provides various instructions to the image reading unit 1, image memory unit 2 and image forming unit 3 and displays the state of said units on the cathode ray tube 65. Also a magnetic bubble memory 68 is provided to store procedures of original reading, image signal processing and image formation thereby facilitating fixed jobs such as the preparation of business forms.

In the foregoing embodiment, the apparatus is divided into the original reading unit 1, image memory unit 2, image forming unit 3 and control unit 4 according to the function for attaining a larger flexibility in the application. For example, in case of printing documents prepared by so-called word processor, the dot pattern signal generated by a character generator in the word processor may be directly supplied as the image signal to the image signal receiving circuit 20 of the image memory unit 2 to obtain documents printed on both sides. Also the apparatus of the present invention may be utilized as a hard copy system for a facsimile, a microfilm reader or similar devices for image processing.

Now there will be explained an embodiment of image formation on both sides of a transfer sheet.

Figure 6:
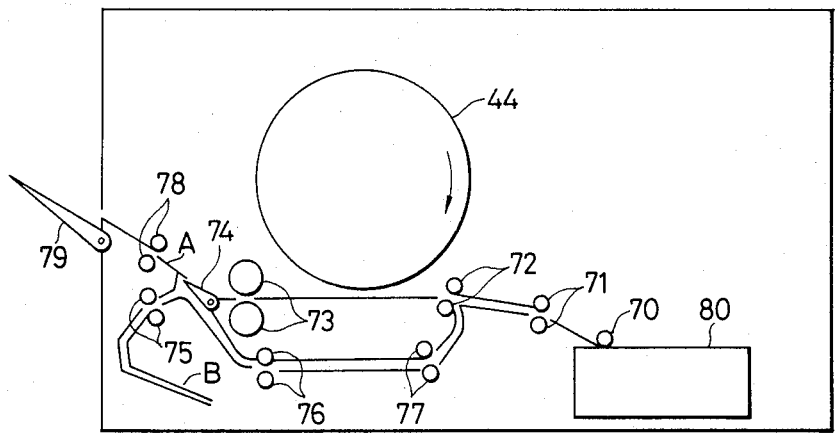
FIG. 6 is a cross-sectional view of a two-side copier in which the present invention is applicable.

FIG. 6 is a schematic cross-sectional view showing an electrophotographic process for image formation on both sides of the transfer sheet, wherein the mechanisms for conducting electrophotographic process are those already known in the art and are therefore omitted in the illustration.

A photosensitive member 44 is rotated in a direction indicated by arrow, and an electrostatic latent image is formed thereon and then developed visible by unrepresented image forming means, according to the image information stored in the image memory A27. The transfer sheet is supplied from a paper storage 80 through feed rollers 70, and is stopped at timing rollers 72 after passing transport rollers 71. When the leading end of the image on the photosensitive member 44 reaches a determined position, the timing rollers 72 are put into rotation to bring the transfer sheet into contact with the photosensitive member 44, and the developed image is thus transferred and is subsequently fixed onto the transfer sheet in a fixing station 73. A path selector 74 guides the transfer sheet advanced from said fixing station 73 into direction A or B. In the illustrated position of the path selector 74, the transfer sheet proceeds along the path A and is ejected onto a tray 79 through ejecting rollers 78. On the other hand, when the path selector 74 is shifted downwards, the transfer sheet is advanced to the path B through transport rollers 75. After the trailing end of the transfer sheet passes the path selector 74, said transport rollers 75 are inversely driven to advance said transfer sheet under said path selector 74 toward transport rollers 76. The transport sheet is further advanced through transport rollers and is stopped at the timing rollers 72. The transfer sheet is inverted by passing the path B, so that the rear side of the transfer sheet is brought into contact with the photosensitive drum 44 for image formation on said rear side according to the image information stored in the image memory B28.

In this manner th switching of image memories in the image memory unit 2 for a transfer sheet enables consecutive image formations on both sides thereof without the intermediate storage of the transfer sheet.

Also high-speed image formation on both sides can be achieved by forming an image on the first side of the succeeding transfer sheet while the preceding sheet having an image on the first side is waiting for the image formation on the second side thereof.

Such embodiment will be explained in the following in relation to FIGS. 7 to 10 showing the flow of the transfer sheets.

FIG. 7-a shows paths A-E for the transfer sheets, each of which is designed to advance a transfer sheet within a determined time. Transfer of a transfer sheet through a path will be referred to as a cycle in the following description. FIGS. 7-b-7-l illustrate the flow of three transfer sheets (a), (b) and (c) in case of image formation on both sides thereof. In the RAM 63, flags FA-FE are set as shown in FIG. 8 respectively corresponding to the passage of the transfer sheets through the paths A-E. A flag FD is set in response to the first passage of a transfer sheet through the path D for image formation on the first side of said sheet, and a flag FD' is set in response to the second passage of a transfer sheet through the path D for image formation on the second side. The flags FA, FD', FE, FB, FD and FC are arranged in the order shown in FIG. 8 in one byte area of the RAM and can be shifted for example from FC to FD, from FD to FB, . . . , in response to shift instruction signals.

FIG. 9 shows a control flow chart of the present invention stored in the ROM 62. Said flow chart will be explained in detail in the following, with reference to a case of two-side image formation on three transfer sheets. Also FIG. 10 summarizes the functions of flags, other than those shown in FIG. 8, used in the flow chart shown in FIG. 9.

The step SP-1 sets a desired copy number in a counter CNT provided in an area of the RAM 63, and initializes the apparatus by resetting all the flags FA-FC and additional flags FW, BK etc. to be explained later, thus attaining a state shown in FIG. 8 corresponding to FIG. 7-a.

The step SP-2 sets flags for a cycle to be executed next by shifting flags FA, FD', FB, FD and FC as explained in the foregoing and setting "1" or "0" as the flag FC. Also said step reads the content of the counter CNT and the state of the flag FC to identify if sheet feeding is required, and, if so, sets a SHEET FEED FLAG in a determined area in the RAM 63.

The step SP-3 judges the state of the flag FD to identify whether image formation is to be conducted on the first side of the transfer sheet, and, if so, sets a FIRST-SIDE PRINT FLAG in a determined area of the RAM 63. Also said step judges the state of the flag FW to identify whether the information to be reproduced on the first side of the transfer sheet should be read and stored in the image memory A27.

The step SP-4 judges the state of the flag FB, and, if it is present, sets a PATH SELECTOR FLAG in a determined area of the RAM 63 in order to shift the path selector 74 to advance the transfer sheet into the path B. The subsequent step SP-5 judges the state of the flag FB, and, if it is present, resets said PATH SELECTOR FLAG.

The step SP-6 judges the state of the flag FD' indicating that the image formation is to be conducted on the second side of the transfer sheet. If such image formation is required, a SECOND-SIDE PRINT FLAG is set in a determined area of the RAM 63. Also said step judges the state of the flag BK to identify whether the image information to be reproduced on the second side of the transfer sheet should be read and stored in the image memory B28.

The step SP-7 resets the PATH SELECTOR FLAG if the flag FA is set.

The subsequent step SP-8 executes the sheet feeding, original reading, storage of image information into the image memories, image formation on the transfer sheet etc. according to the flags set in the foregoing steps SP-2 to SP-7. Thereafter the program returns to the step SP-2 to shift the flags FA-FC, and the steps SP-2 to SP-8 are repeated in the similar manner.

As an example, in case of two-side copying on three transfer sheets, the procedure shown in FIG. 9 is executed in the following manner.

Since the flag FC is not set in the step SP-2-1, the program proceeds to the step SP-2-3 to identify the content of the counter CNT as "3". The subsequent step SP-2-4 subtracts "1" from the counter CNT, shifts the flags FA, FD', FE, FB, FD and FC leftwards to obtain FC=1, thereby attaining a state shown in FIG. 8 corresponding to FIG. 7-b, and sets the SHEET FEED FLAG. After the steps SP-3 to SP-7, the program proceeds to the step SP-8, and, since the SHEET FEED FLAG is already set, the first transfer sheet (a) is supplied from the paper storage 80 to the path C through the feed rollers 70 as shown in FIG. 8 corresponding to FIG. 7-b.

Then the program returns to the step SP-2, and, since FC=1 in the step SP-2-1, proceeds to the step SP-2-2 to shift the flags FA-FC leftwards to obtain FC=0 thereby attaining a state as shown in FIG. 8 corresponding to FIG. 7-c. Since FD=1 in the step SP-3-1, the program proceeds to the step SP-3-2. Since the flag FW=0 in this state, the program proceeds to the step SP-3-4 to set the flag FW, IMAGE MEMORY A FLAG for reading and storing the image to be reproduced on the first side of the transfer sheet into the image memory A27 and FIRST-SIDE PRINT FLAG for image formation on the first side of the transfer sheet. After the execution of the steps SP-4 to SP-7, the program proceeds to the step SP-8 for executing the image reading, storage in the image memory A27 and image formation on the first side of the transfer sheet (a) according to the above-mentioned flags.

Then the program returns to the step SP-2. After identifying FC=0 in the step SP-2-1 and the content of the counter CNT as "2" in the step SP-2-3, the step SP-2-4 is executed to reduce the content of said counter CNT to "1", to shift the flags FA-FC thereby obtaining FC=1 and attaining a state shown in FIG. 8 corresponding to FIG. 7d, and to set the SHEET FEED FLAG. The succeeding step SP-4 sets the PATH SELECTOR FLAG for shifting the path selector 74 in response to the flag FB=1. Consequently the path selector 74 is shifted in the succeeding step SP-8, whereby the transfer sheet (a) is advanced to the path B. Also the second transfer sheet (b) is fed to the path C.

The program again returns to the step SP-2, and, since FC=1 in the step SP-2-1, the step SP-2-2 is executed to shift the flags FA–FC leftwards thereby attaining a state shown in FIG. 8 corresponding to FIG. 7-*e*. Since FD=1 in the step SP-3-1 and FW=1 in the step SP-3-2, indicating that the image to be reproduced on the first side of the transfer sheet is already stored in the image memory A27, the program proceeds to the step SP-3-3 for setting the FIRST-SIDE PRINT FLAG for image formation on the first side of the transfer sheet (b). Then the step SP-5 resets the aforementioned PATH SELECTOR FLAG, whereby the path selector 74 is returned to the original state in the step SP-8. Also image formation is conducted on the first side of the transfer sheet (b) according to the image information stored in the image memory 27.

Subsequently, since FC=0 in the step SP-2-1, the program proceeds through the step SP-2-3 to the step SP-2-4 to reduce the content of the counter CNT to zero, to shift the flags FA–FC leftwards thereby obtaining FC=1 and attaining a state shown in FIG. 8 corresponding to FIG. 7-*f*, and to set the SHEET FEED FLAG. Since FB=1 in this state, the step SP-4 is executed to set the PATH SELECTOR FLAG for shifting the path selector 74 in the step SP-4 to advance the transfer sheet (b) to the path B. Since FD'=1 and BK=0 in the steps SP-6-1 and SP-6-2, the steps SP-6-4 is executed to set said flag BK, IMAGE MEMORY B FLAG for storing the image information to be reproduced on the second side of the transfer sheet into the image memory B28, and SECOND-SIDE PRINT FLAG for image formation on the second side of the transfer sheet. In the subsequent step SP-8, therefore, the path selector 74 is shifted to advance the transfer sheet (b) into the path B. Also the image is read and stored in the image memory B28, and image formation is conducted on the second side of the transfer sheet (a) by unrepresented image forming means. At the same time the third transfer sheet (c) is fed from the paper storage 80 to the path C.

The program then returns again to the step SP-2, and, since FC=1 in the step SP-2-1, the step SP-2-2 is executed to shift the flags FA–FC leftwards to attain a state as shown in FIG. 8 corresponding to FIG. 7-*g*. Since FD=1 in the step SP-3-1 and FW=1 in the step SP-3-2, indicating that the image information to be reproduced on the first side of the transfer sheet is already stored in the image memory A27, the program proceeds to the step SP-3-3 to set the FIRST-SIDE PRINT FLAG for image formation on the first side of the transfer sheet (c) according to the image information stored in the image memory 27. Also since FE=1 in this state, the step SP-5 resets the aforementioned PATH SELECTOR FLAG, whereby the path selector 74 is returned to the original state in the step SP-8 to advance the transfer sheet (a) to the path A. Also image formation is conducted on the first side of the transfer sheet (c).

Then, since FC=0 in the step SP-2-1, the program proceeds to the step SP-2-3. Since the content of the counter CNT is already zero, the program further proceeds to the step SP-2-5 for checking if all the flags FA–FC are reset. As some flags are not yet reset in this state, the step SP-2-2 is executed to shift the flags FA–FC leftwards, thus attaining a state as shown in FIG. 8 correspsonding to FIG. 7-*h*. Then the step SP-4 sets the PATH SELECTOR FLAG, and, since FD'=1 in the step SP-6-1, the program proceeds to the step SP-6-2. As BK=1 in this state, indicating that the image information to be reproduced on the second side of the transfer sheet is already stored in the image memory B28, the step SP-6-3 is then executed to set the SECOND-SIDE PRINT FLAG for recording the image information stored in said image memory B28 on the second side of the transfer sheet (b). In the step SP-8 the path selector 74 is switched to advance the transfer sheet (c) to the path B, and image formation is conducted on the second side of the transfer sheet (b).

Subsequently the program proceeds, through the step SP-2-1 confirming FC=0 and the step SP-2-3 confirming that the content of the counter CNT is already zero, to the step SP-2-5. As all the flags FA–FC are not yet reset in this state, the program proceeds to the step SP-2-2 to shift the flags FA–FC, thereby attaining a state as shown in FIG. 8 corresponding to FIG. 7-*i*. Then the PATH SELECTOR FLAG is reset in the step SP-5 and the path selector 74 is returned to the original position in the step SP-8, whereby the transfer sheet (b) is advanced to the path A. Then the flags FA–FC are again shifted in the step SP-2 to attain a state as shown in FIG. 8 corresponding to FIG. 7-*j*. Since FD'=1 in the step SP-6-1, the program proceeds to the step SP-6-2 for setting the SECOND-SIDE PRINT FLAG for image formation on the second side of the transfer sheet (c) according to the image information stored in the image memory B28. Then the image formation is conducted in the SP-8 on the second side of said transfer sheet (c), and the flags FA–FC are shifted in the step SP-2 as explained before to attain a state as shown in FIG. 8 corresponding to FIG. 7-*k*. The transfer sheet (c) is advanced to the path A and ejected onto the tray 79 in the step SP-8. The flags FA–FC are again shifted in the step SP-2 and judged in the step SP-2-5 to complete the entire procedure.

It is naturally possible to form images only on one side of the transfer sheets by suitable control of the path selector 74.

Also the present invention is applicable to a two-side image forming apparatus having an intermediate tray for storing plural transfer sheets which have been subjected to image formation on the first side thereof.

The image information in the foregoing embodiment is stored in electrically controlled memories such as semiconductor memories, but it is also possible to use for this purpose a screen-structured photosensitive drum for example disclosed in the Japanese Patent Laid-Open GAZETTE No. 19455/1975. In such case the images to be reproduced on the first and second sides of the transfer sheet are stored on a screen-structured photosensitive drum in such a manner as to perform image formation on both sides of the transfer sheet.

As explained in detail in the foregoing, the apparatus of the present invention requires only one exposure of the original document for image formations on one side. Besides the control can be simplified as the original reading need not be synchronized with the image formation. Furthermore the consecutive image formation on the first and second sides of the transfer sheet allows the intermediate storage for the transfer sheets to be dispensed with, thereby simplifying the control for example in case of sheet jamming and enabling realization of a compact apparatus.

Furthermore high-speed two-side image formation is rendered possible by conducting image formation on the first side of the succeeding transfer sheet while the preceding transfer sheet having subjected on the image formation on the first side thereof is waiting the image formation on the second side thereof.

It will be understood that the present invention is by no means limited to the foregoing embodiment but is subject to various modifications within the scope and spirit of the appended claims.

What I claim is:

1. A two-side image forming apparatus comprising:
   first memory means for storing image information corresponding to a first image;
   second memory means for storing image information corresponding to a second image;
   image forming means for reproducing an image on the first or second side of a recording sheet; and
   control means adapted for reproducing the first image on the first side of said recording sheet and the second image on the second side of said recording sheet by means of said image forming means according to the image information stored in said first memory means and said second memory means.

2. A two-side image forming apparatus according to claim 1, further comprising third memory means for transferring image information corresponding to said first image and image information corresponding to said second image to said first memory means and said second memory means.

3. A two-side image forming apparatus according to claim 1, further comprising selector means for selecting the paths of said recording sheet in such a manner that the reproduction of the second image on the second side of said recording sheet is conducted succeeding the reproduction of the first image on the first side of said recording sheet.

4. A two-side image forming apparatus according to claim 3, wherein said control means is adapted, after the reproduction of the first original image on the first side of a first recording sheet, to effect reproduction of the first original image on the first side of a second recording sheet while said first recording sheet is handled for preparation for the reproduction of the second original image on the second side thereof.

5. A two-side image forming apparatus comprising:
   image forming means for image formation on the first or second side of a recording sheet; and
   control means adapted to reproduce the first image on the first side of said recording sheet and the second image on the second side of said recording sheet by means of said image forming means without storing a plurality of recording sheets,
   said control means being adapted, after image reproduction on the first side of a recording sheet, to effect image reproduction on the first side of a second recording sheet while said first recording sheet is handled for preparation for image reproduction on the second side thereof.

6. A two-side image forming apparatus according to claim 5, further comprising selector means for selecting the paths of said recording sheets in such a manner that the image reproduction on the second side of said recording sheet is conducted succeeding the image reproduction on the first side thereof.

7. A two-side image forming apparatus according to claim 5, further comprising first memory means for storing image information corresponding to the first image, and second memory means for storing image information corresponding to the second image.

8. A two-side image forming apparatus according to claim 7, further comprising third memory means for transferring image information corresponding to said first image and image information corresponding to said second image to said first memory means and said second memory means.

* * * * *